Patented Jan. 7, 1936

2,026,697

UNITED STATES PATENT OFFICE 2,026,697

PREVENTION OF OXIDATION

Sidney Musher, New York, N. Y., assignor to Musher Foundation Incorporated, New York, N. Y., a corporation of New York No Drawing. Application January 28, 1935, Serial No. 3,876

7 Claims. (Cl. 99—11)

This invention relates to the protection of substances and materials against oxidative changes, and more particularly is concerned with the protection of food substances especially in solid form against development of undesired oxidation changes.

Deterioration of solid substances, and particularly food or substances used for food, due to oxidation, is well recognized. Such oxidative change may manifest itself in a variety of ways, as for example by development of rancidity in glyceride oils or fats or products containing them, by loss of flavor in the oxidation of essential oils, or products containing them, etc. These oxidative changes take place in a great variety of products, both edible and inedible, and even when such products are in substantially dry form.

In the shelled nut industry for instance, there is a serious problem due to the fact that the shelled nuts such as walnuts, pecans, almonds, etc., turn rancid quite readily. The rancidity of the nuts is not necessarily related to the rancidity of the oils contained in them. In fact, it is generally well recognized that a nut in its natural form will usually keep much longer without development of rancidity, than will the oil expressed from it—depending entirely upon the length of time of the exposure of the nut and upon its quality.

To meet this problem which arises in the sale and distribution of shelled nuts, it has been found necessary to pack them in sealed tins or similar containers, either under vacuum, or in an atmosphere of inert gas to remove the possibility of oxidation. Even under these conditions it has been found impossible to prevent completely, the setting in of rancidity development, due possibly to the fact that the dissolved or absorbed oxygen may come to the surface and cause or initiate oxidation. In addition, it must be recognized that when shelled nuts are kept under vacuum or inert gas, they may keep fairly well for a period of time, but just as soon as the container is opened, rancidity sets in almost immediately.

In the coffee industry as well, serious difficulties are encountered in inhibiting flavor changes and rancidity of the coffee oil. Coffee undergoes substantial changes as a result of oxidation. When coffee has been roasted and ground, rancidity sets in due to the fact that coffee oil is quite an unstable oil. At the time that rancidity sets in there is a noticeable loss of the fresh coffee flavor. Apparently there is some change during roasting which increases the tendency in the coffee towards rancidity and deterioration. Considerable attention has been given to preventing rancidity in coffee oil, and attempts to solve this problem have been made by grinding fresh coffee beans to order, by packing coffee in tin or similar sealed containers under vacuum or inert gases, and by special methods for the distribution of fresh coffee. But even with these developments, the problem has not been entirely answered. Not only is rancidity a factor in the coffee beans of the better grade, but it is even more important with the poorer grades of coffee where the fine flavor and aroma are lost so easily. The problem applies equally to those coffee compounds in which chicory is used, and as a matter of fact, is a problem which is present in a great variety of other dry or substantially dry substances in connection with which oxidation is a serious factor even though rancidity itself may not be the factor, and the oxidative changes are manifested in other ways than that of rancidity.

Not only have the problems not been solved in such industries, but the methods of packaging in special types of containers and under special conditions are elaborate and expensive.

Or reference may be made to milk powders. Whole milk powder has a marked tendency to development of rancidity, while skim milk powder develops a tallowiness or staleness, these changes resulting from either oxidation or aging.

Accordingly there are a wide variety of products, both edible or inedible which are subject to oxidative change, and which products particularly when in solid or substantially solid condition, did not lend themselves to any readily available method for preventing oxidative changes, and even special packaging methods did not solve the problems of the industries in this connection, as pointed out above.

Among the objects of the present invention is the protection of substances particularly solid or semi-solid, or substantially solid against development of oxidative or aging changes, both in connection with edible and inedible products.

Other objects include simple and economical means effectively obtaining such results.

Other objects of the present invention include the securing of such results, particularly in connection with edible products wherein the flavor, taste or other similar characteristics of the food or edible products may or may not be modified as desired.

Still further objects and advantages of the present invention will appear from the more detailed description given below, it being understood, however, that this more detailed description is given by way of illustration and explanation only, and not by way of limitation, since various changes therein may be made by those skilled in the art without departing from the scope and spirit of the present invention.

In application, Serial No. 696,915, filed November 6, 1933, entitled "Stable food products", there is described and claimed the protection of glyceride oil bearing materials primarily, including oils and fats and mixtures thereof, against oxidative changes, such as those which result in rancidity, by the use of sesame products. Sesame seed is particularly set forth and claimed therein for that purpose utilizing the sesame seed in any desirable form, such as a flour or pulverized material, or by way of extracts produced from such sesame material and incorporated with the glyceride oil and fat, or similar product. In that disclosure, crushed sesame seed without segregation of oil from the cake may be incorporated with the oil and/or fat to impart thereto remarkably improved keeping qualities, making the resulting product substantially resistant to development of rancidity and markedly changing the flavor and odor and other desirable characteristics of the product. As illustrative of such treatment as given in that application, the crushed sesame seed may be permitted to remain with the oil treated, or after relatively short treatment, such as for 15 minutes at moderate temperatures, for example, approximately 150° C., the sesame seed fibers may be filtered off, or otherwise removed from the treated oil, the latter exhibiting marked keeping qualities, modified flavor and odor, and yielding at the same time a seed cake of valuable edible characteristics, not alone for the ordinary purposes for which seed cakes are employed, but also because of the manner of treatment, available for human consumption. The sesame seed in ground condition retaining the oil with the seed fiber may be added to the desired oil and/or fat in the amount of from 5 to 10%, for example, and in most instances not exceeding 20%, although, of course, higher quantities may be utilized if desired. A wide variety of oils and fats are referred to as utilizable in accordance with the treatments set forth in that specification, including the various animal and vegetable oils, both in refined and unrefined condition, and including such products as lard, tallow, oleo stearin, hydrogenated derivatives which may be solid products, etc., paint oils, etc. Such treated oils and fats very markedly increase their resistance to the development of rancidity, and show a marked decrease in the development of fatty acid content on standing, exhibit improved taste and odor, and show a far greater stabilization of color which occurs co-existent with stabilization against development of rancidity, and which is of importance to the paint industry as well as from an edible standpoint, so that actually by such treatments as set forth in that prior specification, there are produced novel types of oils and/or fats, or mixtures thereof.

In application, Serial No. 698,543, filed November 17, 1933, for "Fats and oils", there is particularly described and claimed the utilization of other oil containing seeds and nuts than sesame products for the protection of the glyceride oils and fats or mixtures containing the same against development of rancidity, such materials being utilized in a manner analogous to that set forth in connection with the sesame products, and being permitted to remain in the products themselves, or when desired, removed therefrom. The methods of treatment may be by direct infusion as set forth above, or by utilizing solvent extracted components, either by means of volatile solvents or the glyceride oil extracts themselves, from such seed and oil products. Among the nut, seed and fruit products which may be utilized in protecting such glyceride materials against development of rancidity, or other aging changes, there is particularly set forth the use of peanuts, sunflower seed, cottonseed, linseed, cocoanut, etc. utilized in the protection of a wide variety of oils and fats, such as those illustrated above.

In specification, Serial No. 710,727, filed February 10, 1934, entitled "Products from fats and oils and methods of making same", there is particularly described and claimed the protection of glyceride containing materials, such as fats and oils, or mixtures thereof, against oxidative changes, such as development of rancidity, by the utilization of non-oil bearing vegetative matter, such non-oil bearing vegetative matter being materials which either contain no oil whatsoever, or only such minor quantities of oil that they do not serve as a source of oil for commercial or industrial use. The materials illustrated therein as non-oil bearing substances that may be employed include oats, rye, barley, hominy, alfalfa, and flours, such as bleached flour and other forms of cereals, as well as ordinary leaves, or even such products as twigs. These non-oil bearing vegetative matters are employed in the manner set forth above for the sesame products, and may be utilized by direct infusion or the glyceride fat or oil containing materials to protect them against development of rancidity, either with or without removal of the fibers of the products subsequently, or solvent extracted portions of such non-oil bearing vegetative materials may be utilized for protection of the glyceride materials against development of rancidity.

In specification, Serial No. 733,517, filed July 2, 1934, entitled "Foodstuffs", there is particularly described and claimed the utilization of soya bean products in protecting the glyceride materials against development of oxidative changes such as rancidity, the soya bean material being utilizable in any desired form, either in the form of the whole soya bean material, or a flour made therefrom, or the soya bean cake, as is obtained from expeller apparatus, for example, in removing most of the fat content of such soya beans, etc., etc.; the manner of use of the soya bean product being similar to that described above in connection with the sesame material, namely either by direct infusion processes, or by the inclusion of solvent extracted components of the soya bean material incorporated with the glyceride material to be protected against development of rancidity.

It will be noted that in the prior specifications as described above, the oil containing and non-oil containing vegetative matters are utilized primarily for the protection of glyceride containing materials, such as oils and fats or mixtures thereof, or compositions containing them, against oxidative or aging changes, particularly as exemplified in the development of rancidity.

In specification, Serial No. 799, filed January 7, 1935, entitled "Antioxidants", there is particularly described and claimed the utilization of these vegetative materials, as set forth above, including both the oil containing and non-oil containing substances, and extracts derived from them, in the protection of various types of materials other than the oil or fat containing substances against oxidative or aging changes. As illustrative of the oil bearing materials utilized as a source of the antioxidant protectants, various oil bearing nuts, seeds and fruits are referred to, including, for example, sesame seed, peanuts, sunflower seed, cottonseed, poppy seed, linseed, cocoanuts, soya bean, castor bean, etc., whereas illustrating the non-oil bearing or substantially non-oil bearing vegetative matters that may be utilized are the various cereals and grains, etc., including oats, wheat, rye, barley, hominy, corn, alfalfa, and their various products such as the flours, bleached or unbleached, and other forms of the grains and cereals, as well as such vegetative materials as ordinary leaves, such as maple tree leaves, and even twigs. Various forms of these products, as noted, may be employed. Illustrating such types of products, for example, we may utilize the dry, ground soya bean material, or the soya bean cake from which the oil has been expelled, or the highly refined bleached soya bean flour, or the soya bean material in almost any type of form. As set forth in that specification, these various products may be utilized in treating and protecting various types of substances, including milk powders, including chocolate or other flavored milk products, etc., cheeses, fruit juices, egg products including egg whites and egg yolks, cod livers and oils, coffee and coffee products, yeast, cocoanut juice and similar juices, rubber and rubber compositions, mineral oils and mineral oil distillates including gasoline, lubricating oils, mineral oils, etc., leather, linoleum, paper, textiles, etc.

It has been found that the antioxidants may be utilized in protecting solid or substantially solid products, and particularly products in the form of discrete masses, against development of oxidative or aging changes. Particularly important in this connection is the utilization of the various vegetative materials set forth above, including both the oil-containing seeds, nuts and fruits, or derivatives of them, and the substantially non-oil containing vegetative materials, such as the cereals, grains, etc.

It has been found unnecessary to apply the antioxidant materials, or the derivatives containing the antioxidant factors, in liquid condition, or to products which are to be protected against rancidity which exist in liquid form, or are convertible into liquid form, although of course, the utilization of the liquid state is a convenient means for producing intimate contact between the source of antioxidant activity and the product to be protected. The importance of this is recognized by the fact that no satisfactory means of preventing oxidative or aging changes in substantially solid products have been available in the art, which emphasizes why the prior art utilized special packaging means as illustrated above in connection with solid products, such as shelled nuts, coffee, etc. Furthermore, in many cases, such as those just mentioned, it is impossible or sometimes inadvisable to utilize a liquid medium as the means for obtaining the intimate contact for producing antioxidant activity. The present invention enables in such cases where it is impossible or inadvisable to utilize the liquid medium as a means for such intimate contact by operating in a substantially dry state, or where possible utilizing a liquid medium, and subsequently converting the product into a substantially dry condition. A number of examples illustrative of the present invention are set forth below.

For example, in the case of shelled nuts, which oxidize or turn rancid very rapidly when exposed to the air, it is found satisfactory to apply a thin film of the antioxidant material, such as oat flour, on the outside of the nuts. This may be done by any desirable means, such as by spraying or blowing a finely milled oat product, for example, on the shelled nuts, merely leaving as much of the oat flour on the nuts as is required to cover substantially the exposed portion. Another method would be merely to dip the nut into the oat flour, and then to blow away by means of a current of air, or other gas, most of the oat flour. In this manner that portion of the surface which has been cut, or the surface upon which there is any nut oil which has been brought out during the shelling operation tends to hold the oat flour in position. More substantial adherence is secured at such points than at the ordinary surfaces which have remained undisturbed.

The amount of oat or other antioxidant material present on the nuts can be made so small as to be scarcely detectable at all, as little, for example as ¼% of oat flour, based on the total weight of the nuts, materially extending the life of the shelled nuts by at least double, as compared with untreated nuts. On the other hand, under conditions where the presence of the oat flour in a more substantial amount does not prove undesirable, there may be left on the surfaces from 2 to 5% of oat flour in contact with the surface of the nut or other materials. Crushed nuts may be treated in the same way, but desirably the nuts may be crushed in the presence of the antioxidant material, such as the oat flour, so as to obtain a fine dispersion of the oat flour through the nuts at the time of grinding or crushing. It should also be borne in mind that the character of antioxidant material employed will determine whether or not there is any substantial change in taste or odor of the shelled product. Materials like oat flour, and in general the grains and cereal flours not having any great or appreciable change in the taste or odor of the treated products, whereas other materials like sesame derivatives may be utilized to materially affect and modify the flavor, taste and odor of such products.

The particular manner of incorporating the antioxidant material with the solid products or substantially solid materials, particularly when in the form of discrete masses, may vary as desired, those given above illustrating some of the means that may be employed in the treating of shelled nuts or other products as set forth below. Other means include, of course, the utilization of extracts, particularly in volatile solvents, from which extracts the volatile solvents may be readily eliminated, either before the incorporation of the antioxidant extracted material with the product to be protected, or after the volatile solvent extract has been applied, and substantially immediately removed from the product treated. Of course, some of the methods will be available for use with some products, while others will be required in connection with products of different types, depending on the nature of the materials to be protected against antioxidant activity, and their condition and utility, as well as the nature of the antioxidant material being employed.

Again it should be noted while oat flour is particularly utilized as illustrative in connection with the utilization of antioxidant materials, any of the vegetative materials referred to above may be utilized, and we may particularly mention in addition to the oat flour, such products as barley, hominy, soya bean flour, crushed sesame seed, crushed peanuts, crushed linseed cake, soya bean press cake, castor bean pumace, corn germ cake, corn gluten, etc., either in and of themselves in any of the desirable forms, such as flours, press cakes, etc., or extracts thereof, etc.

In addition to the shelled nut field, a somewhat related development is in connection with the protection of various seeds or beans that ordinarily tend to deteriorate rapidly, either as a result of oxidative or aging changes, and any of which seeds and beans or similar products may be protected in a manner analogous to that discussed above in connection with the shelled or crushed nuts.

Coffee, as has been pointed out, undergoes substantial changes as a result of oxidation or aging. Coffee products, including coffee beans, may accordingly be treated in accordance with the present invention to protect them against such oxidative or aging changes. The coffee beans may be treated, for example, with the oat flour at the time that the beans are shipped from the place of production, but since most of the deterioration in the coffee beans takes place after the beans have been roasted, it is more desirable to treat the coffee beans with the oat flour following the roasting operation. While it is true that some of the antioxidant materials, such as the oat flour referred to illustratively, will be left after grinding, so that the product may no longer be termed a pure coffee material, the presence of the oat flour will in no way prove undesirable from the standpoint of taste or flavor. Consequently, in the manufacture of coffee compounds, where modification of flavor by the added antioxidant material would be undesired, such relatively bland materials as oat flour can be used to a substantial degree, avoiding any flavor change which under such circumstances is negligible. The invention is particularly applicable to the protection of the cheaper grades of coffee and coffee compounds against oxidative changes, because the delicate aroma of these products is lost so very easily.

By the utilization of these means of protecting coffee and coffee compounds, the necessity for use of tin or other sealed containers, or of storing under inert atmospheres or vacuum, is substantially eliminated by the utilization of any of these antioxidant materials applied as desired, for example, particularly emphasizing such materials as the cereal flours, including oat flour, or crushed sesame seed, where change in flavor, etc. is not undesirable, etc.

Instead of using the cereal flours as set forth above in the protection of coffee and coffee compounds, finely ground unroasted coffee beans may themselves be utilized as an anti-oxidant to protect roasted coffee from deterioration, using for example 2% of the finely ground unroasted coffee beans. In this way, the tendency towards rancidity and deterioration which is developed in the coffee bean by roasting, may be protected against by the utilization of the unroasted coffee beans, for example, employing about 2% of such material in connection with the coffee beans, and thus avoiding the introduction of non-coffee type substances like oat flour if it is considered inadvisable to utilize oat flour or similar materials.

Further, it may be noted that although there are such products as corn flakes, wheat flakes, etc. on the market, there is no such product as oat flakes available, because of the fact that when the oat product is roasted, it apparently itself turns rancid quickly. This effect is apparently quite strange in view of the presence in the oat flour itself of antioxidants, and also in view of the fact that the oat flour contains as little as 4% of oat oil. But apparently the roasting process in some way makes the oat product susceptible to relatively rapid development of rancidity. The roasted oats or roasted oat flour may, however, be made available for utilization in the art in accordance with the present invention by treating such roasted oat product with unroasted oat flour, for example, utilizing 5% of fresh oat flour, or by any of the other flours, etc. referred to above. A mechanical mixture of the two is sufficient to pass on to the roasted oat flour the necessary antioxidants. However, if desired in order to get more intimate combination than is available by mechanical mixture, the admixture of fresh oat flour with the roasted oat flour may be dissolved in water, or admixed with water, and immediately thereafter spray dried in order to produce a resulting product that is substantially dry, and which consists of a thorough admixture of the two oat flours. The fresh oat flour is considered the more desirable product to utilize in connection with producing oat products of this character, rather than the other cereal or grain flours, etc., but of course the latter may be utilized if desired.

Similarly the cereals and grains, etc., as exemplified by oat flour may be used in conjunction with spices, either ground or whole, in order to inhibit undesired oxidative changes in such spices which result in deterioration or loss of flavor of the product, even though rancidity itself may not be a direct factor in this case.

Cheeses may be rubbed with any of these antioxidative substances, including, for example, the cereal flours, and particularly oat flour, to inhibit oxidative changes therein or aging effects due to oxidation or other causes, which may desirably be inhibited by this manner of treatment.

The various powdered milk and cream products may similarly be protected against undesirable oxidation or aging changes by the present invention. Mere mechanical mixture, for example, of an oat flour with the whole milk flour may be employed, or similarly oat flour may be mixed with skim milk powder to inhibit the development of tallowiness or staleness.

In connection, however, with such products as these dried milk products, instead of mere mechanical admixture, such as for example, the incorporation of 10% of oat flour in the milk powder, either whole or skim milk powder, it is possible to produce the final dry product by adding the desired antioxidative substance, such as the oat flour, to the milk, either whole or skim, before the drying operation, or extracts of the antioxidative substances may similarly be employed. Thus, for example, oat flour may be homogenized with liquid milk, and the resulting product subsequently spray dried, resulting in a substantially dry composition in which the particles of the dry milk are intimately incorporated with the anti-rancidity protectant.

Similarly at the time of manufacture of the milk powder, a small quantity of finely ground, unroasted cocoa beans may be added to the liquid milk, and the mixture subsequently spray dried in order to insure the protection of that milk against oxidative change. The ground cocoa beans may, of course, be mechanically mixed with the milk powder, but as indicated before, it is desirable to obtain the more intimate combination of the substances by the utilization of the liquid milk for incorporation with the antioxidative ingredient, followed by the spray drying operation.

Such methods as those which can be employed with the milk prior to the spray drying operation illustrate means of utilizing the present invention in the protection of substantially dry products protected by the vegetative materials, for example, against deterioration due to oxidative or aging changes, wherein the liquid state is employed in one stage of operations.

These various vegetative materials may also be employed in the protection of milk chocolate or similar products for which purpose 2%, for example, of finely ground unroasted cocoa beans may be added to milk chocolate or similar products, in any of its stages of manufacture, and such addition will substantially inhibit deterioration of the whole milk or similar products that may be used in that milk product. Even though cocoa butter of itself exhibits a fairly satisfactory keeping quality, of itself it is not sufficient to protect the fat of the whole milk from deterioration, and the incorporation of the unroasted cocoa bean in the manner set forth above gives that added protection which materially increases the retention of desirable characteristics in the products.

As further exemplifying the utilization of a liquid stage through which the product may be passed in the production of substantially dry products protected against oxidative or aging changes, mention may also be made of the incorporation of these vegetative materials, or extracts of them, with liquefied or melted fats or oils that are normally solid at ordinary temperatures. Such oils and fats when liquefied or melted may be directly infused with the vegetative material, and the resulting product permitted then to cool to substantially solid condition, while retaining the incorporated vegetative material to protect such products against development of rancidity or other oxidative changes. Or if desired, in such cases, the liquefied or melted oil or fat after direct infusion or incorporation of the vegetative material may have the fibers of the latter removed before the product is permitted to solidify—by the utilization of any means, such as filtration, etc.

Or the liquefied condition can be utilized in connection with such products as oils and fats which lend themselves, at least in some instances, to solution in various organic solvents, particularly of volatile character, such solutions being utilized for contacting with the vegetative materials, or extracts of them, followed by elimination of the solvents whereby the substantially solid material is obtained carrying the antioxidative ingredient.

As briefly mentioned above, solvent extracts of the vegetative materials carrying the antioxidant properties may be utilized, particularly the volatile solvent extracts of the cereals and oil-bearing seeds, nuts and fruits, or seed or nut cakes. Such solvent extracts include, for example, the alcoholic extracts of the cereal flours, such as oat flour, barley flour, yellow or white hominy, or such oil bearing seeds as soya bean flour, or such oil bearing seed press cakes as peanut meal, cottonseed meal, corn meal, etc. Any method of producing the extracts may be used, either batch or continuous, including for example direct contact of the cereals or crushed seeds with ethyl or ordinary alcohol. Where an oil containing material, such as seeds or nuts, is being extracted, a solvent is more desirably chosen which does not substantially remove the glycerides from the material, so that the extract is substantially free from oil or fat. Where the material is substantially oil free any solvent may be utilized. The extract may be filtered to remove residual vegetative fibers, or where presence of the fibers is not undesirable, filtering is not necessary. In some cases, the unfiltered material is more effective in its antioxidant activity, whereas in other cases, as oat flour extract in alcohol, the difference is not so marked. In general, the alcoholic type of extraction media remove considerably less of the oils present than do the gasoline types of extraction media. An alcohol extract of whole pulverized oats is substantially free of oat oil, while a gasoline extract may contain the entire 4 to 5% of oat oil present in the oats. The alcoholic extract of soya bean oil is also substantially free of oil. The gasoline type of extraction may, if desired, be applied to the press case left after oil expression or expulsion, as for example in the case of the soya bean press cake. But here too avoidance of the presence of oil may be desirable by utilizing the alcoholic type of extract. The extracts may be utilized as such, or more desirably the volatile solvent may be distilled out, and the residue employed as a concentrate of antioxidant activity. In general, such residues obtained, for example, by vacuum distillation and removal of the alcohol leaves a resultant concentrate of somewhat dark color and agreeable odor, but usually neither the color nor odor materially affects the products with which the concentrate is used, particularly since as a general rule the percentages of such concentrates employed may be very small, as for example from .02 to 1%. As illustrative of such extracts, an ethyl alcohol extract of oat flour can be made by the batch process obtaining 3% of the oat flour during the alcoholic extraction. .1% of such concentrate added to castor oil increases its life from seven to ten-fold. Where the extracts tend to deposit crystals following mixture with a concentrate, such as a liquefied oil or fat, such crystals may if desired be removed by filtration.

Any of these various extracts may be utilized in accordance with the present invention. The extract in the volatile solvent may be utilized for application to the product to be protected against development of rancidity, and the solvent media subsequently evaporated away. In other cases, the volatile solvent is first removed from the extracted antioxidant material, and the latter in substantially solid or dry condition may be admixed or employed in any of the ways set forth above for treatment of the desired products to protect them against the development of rancidity.

While the application of the invention to foods and food ingredients has been particularly set forth above, the invention may similarly be applied to non-edible substances including rubber, resins, soaps, greases, etc., particularly when the products are in the form of discrete masses, and where the incorporation of dry materials for protection of such products against development of rancidity, or oxidative, or aging changes are particularly desirable. Similarly the invention may also be applied to a large variety of drugs, chemicals and pharmaceuticals.

Having thus set forth my invention, I claim:

1. A substantially solid food material subject to oxidative change, in the form of discrete masses carrying a surface coating of a vegetative antioxidative substance.

2. A substantially solid food substance in the form of discrete masses carrying a dust of vegetative antioxidative material on the surfaces thereof.

3. The method of protecting a substantially solid food substance subject to oxidative change which comprises applying a surface coating of a vegetative antioxidative substance to said solid substance.

4. The method of protecting a substantially solid food substance which comprises dusting said food substance with a vegetative antioxidative material.

5. A substantially solid food material subject to oxidative change, in the form of discrete masses carrying a surface coating of oats as a vegetative antioxidative substance.

6. A substantially solid food material subject to oxidative change, in the form of discrete masses carrying a surface coating of barley as a vegetative antioxidative substance.

7. A substantially solid food material subject to oxidative change, in the form of discrete masses carrying a surface coating of hominy as a vegetative antioxidative substance.

SIDNEY MUSHER.